US009837128B2

(12) United States Patent
Amura

(10) Patent No.: US 9,837,128 B2
(45) Date of Patent: Dec. 5, 2017

(54) ELECTRONIC IMAGE CREATING, IMAGE EDITING AND SIMPLIFIED AUDIO/VIDEO EDITING DEVICE, MOVIE PRODUCTION METHOD STARTING FROM STILL IMAGES AND AUDIO TRACKS AND ASSOCIATED COMPUTER PROGRAM

(71) Applicant: Mario Amura, Torre Annunziata (IT)

(72) Inventor: Mario Amura, Torre Annunziata (IT)

( * ) Notice: Subject to any disclaimer, the term of this patent is extended or adjusted under 35 U.S.C. 154(b) by 0 days.

(21) Appl. No.: 15/322,900

(22) PCT Filed: Jun. 23, 2015

(86) PCT No.: PCT/IB2015/054683
§ 371 (c)(1),
(2) Date: Dec. 29, 2016

(87) PCT Pub. No.: WO2016/001793
PCT Pub. Date: Jan. 7, 2016

(65) Prior Publication Data
US 2017/0140797 A1 May 18, 2017

(30) Foreign Application Priority Data

Jun. 30, 2014 (IT) .............................. RM2014A0342

(51) Int. Cl.
*G11B 27/34* (2006.01)
*G11B 27/031* (2006.01)
(52) U.S. Cl.
CPC ............ *G11B 27/34* (2013.01); *G11B 27/031* (2013.01)
(58) Field of Classification Search
CPC ............................... G11B 27/34; G11B 27/031
See application file for complete search history.

(56) References Cited

U.S. PATENT DOCUMENTS 6,738,075 B1    5/2004  Torres et al.
9,015,249 B2 *  4/2015  Chandler ................ H04L 67/02
                                                        709/205

(Continued)

FOREIGN PATENT DOCUMENTS

EP    1347455 A2    9/2003
EP    1646220 A1    4/2006

OTHER PUBLICATIONS

International Search Report dated Sep. 29, 2015 issued in PCT/IB2015/054683.

*Primary Examiner* — Mishawn Hunter
(74) *Attorney, Agent, or Firm* — Scully, Scott, Murphy & Presser, P.C.

(57) ABSTRACT

An audio/video editing electronic device comprising: at least visual and manual user interface means configured for allowing the interaction with said user; a data processing unit, configured for executing a computer program aimed to the creation of videos from audio tracks; means of access to a plurality of digital images; means of access to at least one digital audio track; said electronic device is configured for presenting on said visual user interface means at least part of said plurality of digital images in a predetermined images appearance sequence from said user through said manual user interface means; and for recording a video comprising the sequence of images arranged in an order and temporal interval of appearance determined in accordance to a plurality of commands assigned by said user through said manual user interface means at the same time with the listening of an audio track.

20 Claims, 12 Drawing Sheets

(56) References Cited

U.S. PATENT DOCUMENTS

| | | | |
|---|---|---|---|
| 2002/0033889 A1 | 3/2002 | Miyazaki | |
| 2004/0167783 A1 | 8/2004 | Nagai | |
| 2007/0296809 A1* | 12/2007 | Newbery | H04N 13/0239 |
| | | | 348/42 |
| 2008/0247726 A1 | 10/2008 | Lee et al. | |
| 2012/0128205 A1* | 5/2012 | Lee | G06K 9/00791 |
| | | | 382/103 |
| 2016/0098620 A1* | 4/2016 | Geile | G06K 9/6296 |
| | | | 382/103 |

* cited by examiner

PRELIMINARY SET UP OF MFG FILTERS APPLICATION MODE

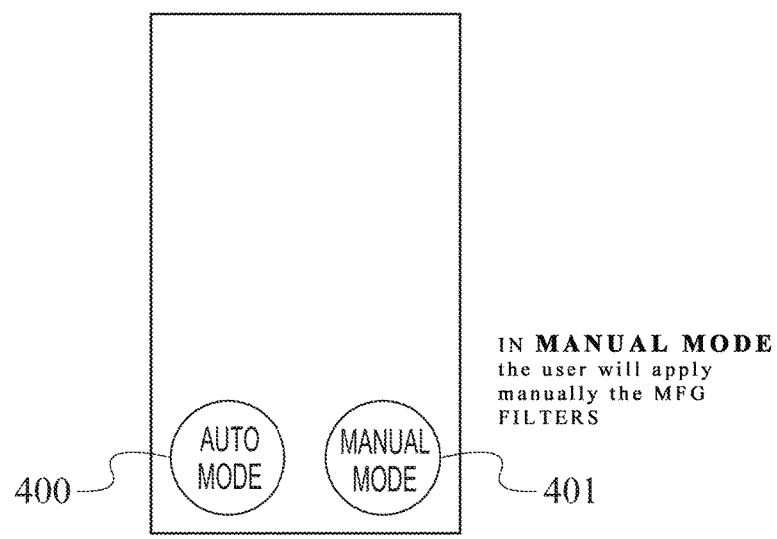

IN MANUAL MODE the user will apply manually the MFG FILTERS

400 — AUTO MODE     MANUAL MODE — 401

IN AUTO MODE the system and the method will apply automatically MFG FILTERS to the image source to generate new frames by calculating a number of new numeric images to be introduced into the images sequence (205) according to the number of images already present into the images sequence and according to the lenght of said audio track (300).

Fig. 8A

SAMPLE VIEW OF MFGF INTERFACE SCREEN

ELECTRONIC IMAGE CREATING, IMAGE EDITING AND SIMPLIFIED AUDIO/VIDEO EDITING DEVICE, MOVIE PRODUCTION METHOD STARTING FROM STILL IMAGES AND AUDIO TRACKS AND ASSOCIATED COMPUTER PROGRAM

It is herein described a system and method for creating video content from a sequence of digital still images and a digital audio track, by means of an instant (real-time) audio-visual association solely defined by operating a two-keys interface while listening the aforementioned audio track. More precisely, the present method will enable the user to specifying either a new order in the original sequence of frames and/or the desired duration of each frame by simply performing the audio-video synchronization through a music inspired combination of taps on two dedicated keys (604, 605 and/or 105a, 105b) provided by the interface. Additionally, the proposed system will provide simple yet powerful functionalities to extend the number of the original still images available for the video creation by means of procedural variations of these images generated via specifically designed filters (Multi-Frame Generator Filters) and related interface in both automatic and manual modality.

FIELD OF INVENTION

The present invention relates generally to the field of digital video content creation, audio-visual synchronization and digital image editing. In particular, the proposed system and method is related to hardware and software environments featuring a visual interface and enabling image gallery editing/ordering for video creation and audio synchronization purposes.

BACKGROUND OF INVENTION

Today there are a lot of software applications for creating video clips from still images. The result of these programs is basically a video sequence in which the author is able to specifying the still images to be included and an audio file to be played as soundtrack. In these videos, commonly referred as "slide-shows", the visualization order and the duration of each still image can be globally predetermined (e.g. 2 sec for each image), randomly assigned by a software or specified for each image by the user through an editing session often complex and tedious. Since digital cameras emerged on the consumer market, the number of pictures captured is constantly increased. In the film-era the number of shots was limited by the small number of frames available in a film roll. With the advent of digital photography, the number of pictures that can be shot quickly and at minimal cost has grown exponentially, providing the premise to transform those images into a video work.

As a result, many software applications were introduced for assembling a video by selecting a number of pictures in a given order and by specifying a soundtrack through a digital audio file. The result is a video that presents the images one after the other to a predetermined time interval established through an editing operation by the user.

This standard approach has two main limitations:
a) the user must determine the display time for each image "before" of recording the video (i.e. not in real-time), setting the duration of each image to be displayed before seeing the result;
b) this process, beside being not trivial, result in a smaller chance of syncing video and audio effectively, if the user is not an experienced professional.

With the present invention, the applicant aims at designing and developing a system and method for simplifying the creation of audiovisual contents, solving the issues described above and, unlike any other software, enabling the user to set the duration and the order of appearance of each image through an intuitive, inspired-by-music approach: "Playing pictures".

SUMMARY OF THE INVENTION

There is presented in the following a system and method for the creation of digital video contents by combining a gallery of still digital images and a digital audio track through "on-the-fly" synchronization inspired by music listening. The proposed system includes:
  A simply operated, effective visual interface enabling the user to control the video generation process;
  frame(s) selection functionalities, providing easy and rapid access to any image gallery;
  procedural based generation of new frames as a variations of gallery images by means of specifically designed Multi-Frame Generator filters (FIG. 8b);
  digital audio track selection functionalities, to associating a music score to the image gallery;
  the said system and method is designed to providing image gallery visualization and arbitrary gallery re-ordering (FIG. 6) functionalities through a dedicated visual interface, according to user preferences.
  Once a satisfying ordering of the whole gallery is achieved, the user will be able to proceed with the video creation by simultaneously playing the audio track and displaying each of the gallery images according to the desired duration and order by simply pressing the Previous/Next keys (FIG. 16 604-605 and FIG. 1 105a-105b). More precisely, the pressure of any of these two direction keys (604-605) will trigger the changing of the currently displayed image and the recording of the duration of the previously displayed frame, corresponding to the time elapsed since it was shown.
  It has to be remarked that to ensuring a smooth video creation process on a wide range of electronic devices, during the video creation stage, only the resulting order and duration of each frame displayed will be recorded, to be used in the final rendering stage to assemble in synchro the desired audio-visual sequence from the original images and audio track.
  The said system and method includes specific functionalities for increasing the number of available gallery images by means of "Multi-frame Generator Filters" (shortly MFG Filters) which, applied to a selected image or even to a set of images, deliver multiple variations of each image, thus extending the overall number of frames available for the subsequent video creation process (FIG. 8b-FIG. 15-FIG. 16). More precisely, any of the aforementioned filters, is able to create a set of variations of the selected image(s) by applying an image-processing algorithm according to a set of specific parameters assigned either in "Manual" and "Automatic" modality (FIG. 8a-FIG. 8b). In both the modalities, this operation results in an increased number of frames that can result beneficial for the video creation approach both in term of creative efficacy and of music-synchronization capability.

The said system and method includes a visual interface to control the digital camera . . . (FIG. 19) in case the electronic device 100 is used for shooting pictures, a specific screen of the visual interface will allow the user to take multiple shots each featuring a variation of focusing of shutter-timing parameters and or to visualize "real time" an adjustable blur effect on the screen during the shooting.

This interface layout is meant to provide a more immediate level of control of image parameters. Preferably, the aforementioned controls are graphically rendered as sliders which regulate the related effect between a minimum and a maximum level of intensity.

The said system and method includes a Video creation process control interface (FIG. 16 604-605), providing a couple of arrow keys positioned at the left and right sides of a preview window displaying the current image in the preordered sequence, and whose purpose is to instantly change the current image by substituting it with the next frame or the previous frame in the sequence.

The said system and method includes a visual interface (FIG. 18 801-802) aimed to provide the user with real-time info about available images and residual audio duration, during the video creation process. More precisely two pie-shaped indicators are available in the interface, displaying respectively the remaining duration of the digital audio track and the remaining number of unused images as an unfilled fraction of a circular area, whereas the filled fraction represents respectively the elapsed audio timing and the number of frames already displayed.

BRIEF DESCRIPTION OF THE DRAWINGS

The said invention is herein described in two particular implementations that by no means has to be considered limiting of its possible embodiments and is schematically depicted in the following figures and drawings:

FIG. 8a depicts a configuration screen from the software related to the present invention during the preliminary setup of the manual/automatic modality for the application of the Multi-Frame Generator Filters:

DESCRIPTION OF THE PREFERRED EMBODIMENTS

The design of the present invention originates from the proponent's belief that the process of creating video from still images could be simplified and made more effective while at the same time maximizing creative freedom also by enabling an intuitive approach to the audio-video synchronization.

According to this approach, it would result much more simple and inspiration-driven to listening to a selected sound track and choosing in real-time what image from a pre-ordered gallery has to be displayed in a given moment and for how much time, instead to pre-determining the duration by means of a fixed parameter.

In other words, the user should be able to browse the image sequence on-the-fly by simply pressing a couple of (next/previous 604-605 or 105a-105b) keys while simultaneously listening to the preferred music score and transparently recording the audio-video association.

The final result of this creative process will be a video work in which, thanks to the software, each frame is displayed for the exact amount of time and in the exact order defined by the user according to his/her music-inspired creative drive.

The user will therefore be able to intuitively "play the pictures" by finger-syncing the music score rhythm and the image visualization rhythm.

Main Operating Steps.

Figure 7:
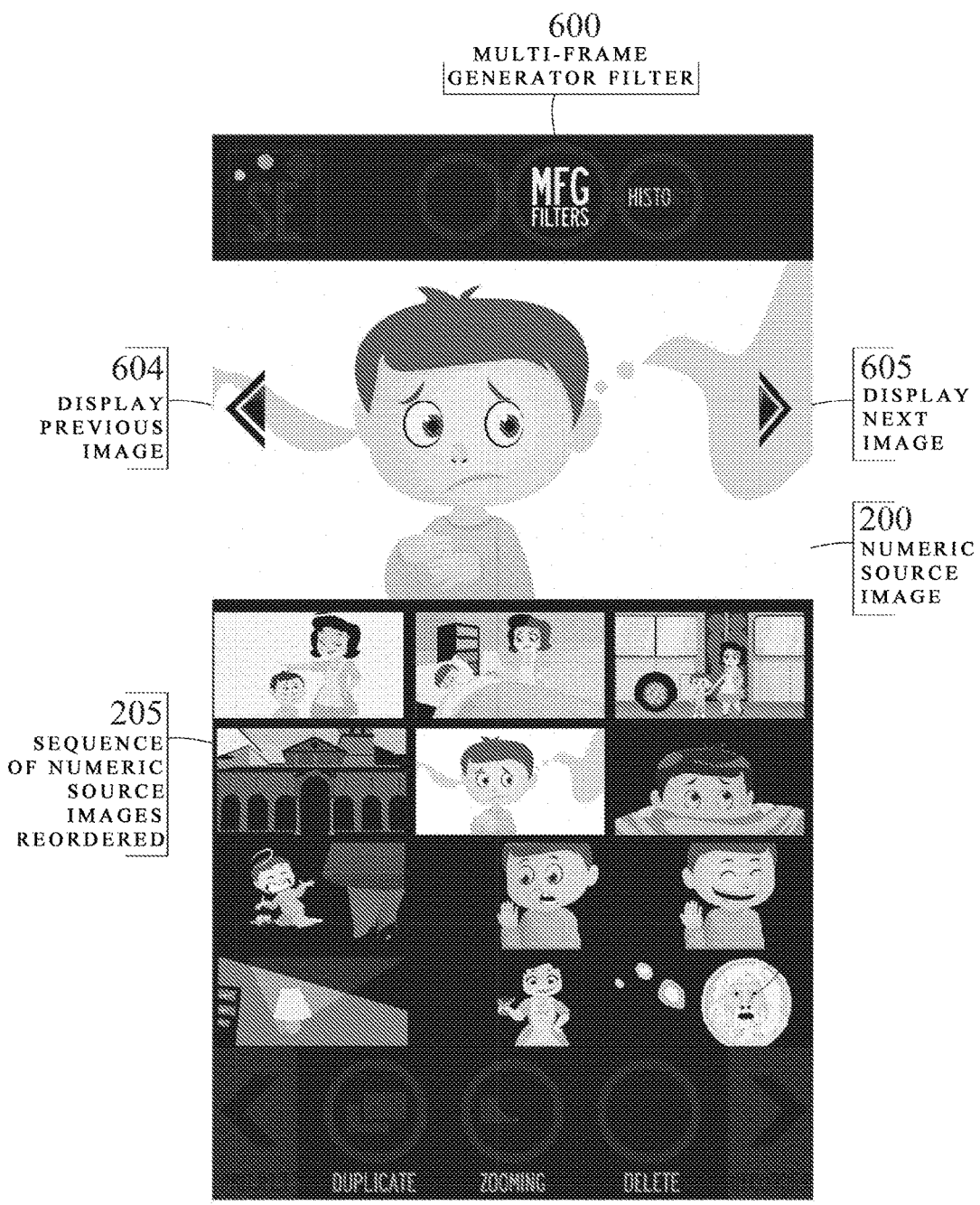
FIG. 7 shows an example of the interface for ordering the previously selected images.
Figure 8B:
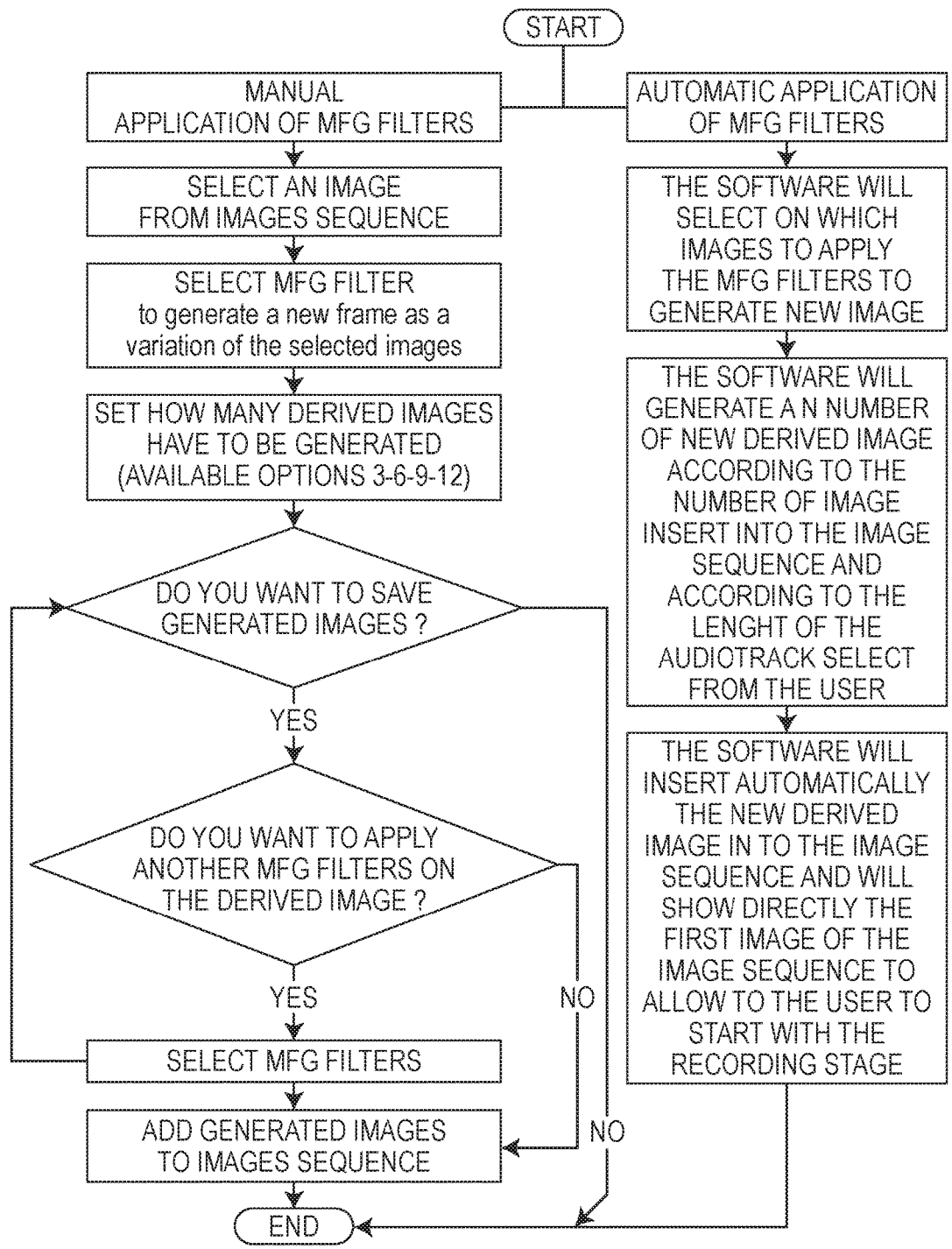
FIG. 8b explain the flowchart of the application of the Mfg Filters in Manual or Auto mode.

The system and method subject of the present invention is designed for operating through six main steps:

- a first "INITIALIZATION" step, in which the user sets the basic operating parameters of the system subject of the present invention: this step is represented in FIG. 8a in a preferred embodiment (in any way to be considered limiting of other possible embodiments) that provides the user with two different system operating modalities:
    - a "AUTO" modality by which most of available functionalities are automatically applied by the system. In particular in AUTO" mode the system will generate automatically new frames applying the MFG Filter) (FIG. 8b) although the user maintains control over the image syncing while listening to music in the recording Stage;
    - an advanced "MANUAL" modality (arrow A), by which the user have much greater control over available functionalities. In particular in "MANUAL" mode the user will select the images from which to generate new frames applying the MFG Filter (FIG. 8b) and will set how many new frame to generate from the image source. The users regulate manually the intensity of the MFG Filters.
- a second "ORDERING" step (from FIG. 5 to FIG. 14), aimed at reordering the available gallery of digital images and/or increasing the number of available images through specifically designed Multi-Frame Generator Filters described in detail later on;
- a third "RECORDING" (form FIG. 15 to FIG. 18) step, for generating a video from still image while listening to previously selected soundtrack;
- a fourth "EDITING" step, in which the recorded video sequence is edited for titling, color correction, etc.
- a fifth "SHARING" step, for sharing the final video work through a choice of social networks selectable via a dedicate interface screen;
- a sixth, optional. "LIVE-SET" step, through which the electronic device 100 (smartphone, tablet, laptop, remote controller, etc.) can be used for displaying a set of interface screens controlling the projection of gallery images by means of external projection devices.

In detail, according to the automatic (FIG. 8a 401) application of the MFG filters, the software will first select on which images to apply the filters to generate the new images, and then it will generate a number N of new derived images according to the number of images inserted into the image sequence and according with the length of the selected sound track (300). The new derived image will be automatically inserted in the sequence (205), and it will show directly the first image of the images sequence to allow the user to star with the recording stage.

Hardware

Figure 1:
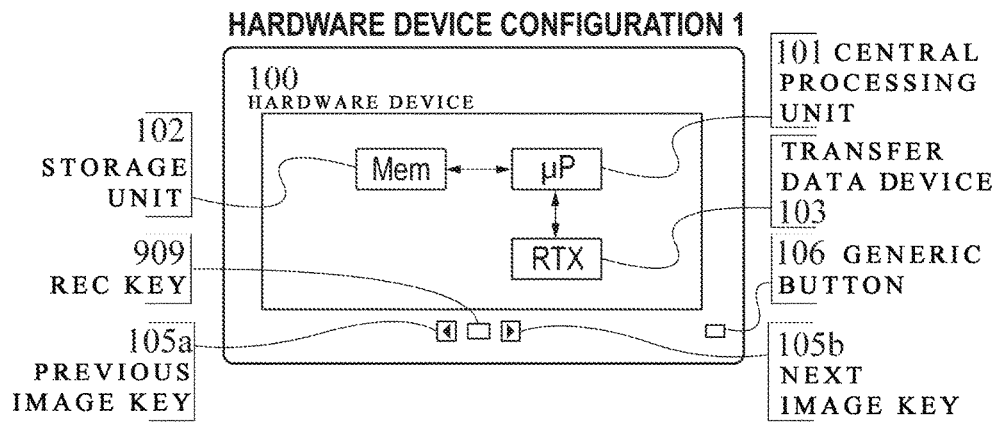
FIG. 1 illustrates a first embodiment of electronic device implementing the present invention operated solely via a visual touch-based interface (Initialization Step)

With regard to FIG. 1, with the reference number 100 a first preferred embodiment of electronic device for simplified audio-video editing is shown.

Figure 2:
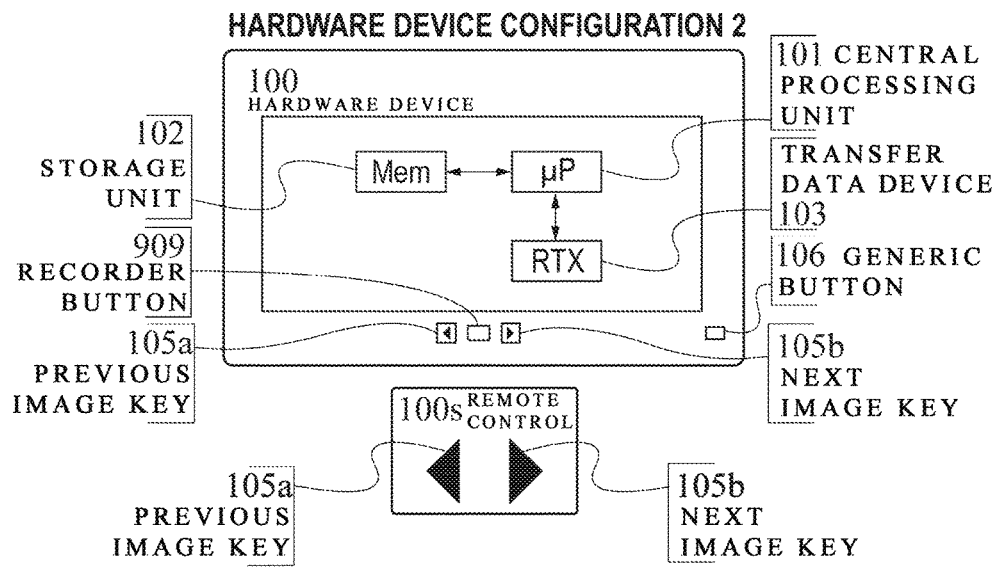
FIG. 2 illustrates a second embodiment of electronic device implementing the present invention and including two physical units: a display unit for content visualization and a separated buttons operated interface unit.

FIG. 2 illustrates a second embodiment of electronic device 100 subject of present invention, including two distinct bodies 100f and 100s; the former featuring the visual user-interface 104 while the latter featuring a physical user-interface 105 based on possibly retro-illuminated physical buttons.

In this last embodiment, the two bodies 100f and 15 are linked by a data communication cable (wired version), but they could well be connected wirelessly to enabling remote command and control through the optional manual interface 105. Though this configuration is not illustrated in this document, it has to be considered included in the present invention.

Memory unit 102 is designed to enabling the storage of a number of digital images 200 as well as the storage of at least an audio file 300.

The following lines describe the software application controlling the said device's operations.

It has to be remarked that, though in the next paragraphs the digital images and the audio file(s) subjects of the system's processing are considered to be stored in memory 102 of aforementioned electronic device 100, this configuration should not be considered limiting in any way of system's architecture.

Digital images and audio files could indeed be stored in any mass storage device, possibly external to electronic device 100, like for a pen-drive, an external hard-disk or a memory space on a server remotely accessible through the internet.

The initial step preparatory to the usage of the software application related to the present invention is represented by shooting and collecting a number of pictures relevant to the user's concept of the video to be made. These pictures are digitally stored in memory 102 as indexed images 200 and they can be captured by means of a professional-level digital camera, a consumer-level point-and-shot digital camera, or directly via the image capture capabilities provided by the electronic device 100 subject of present invention (Take a Photo with the original digital camera interfaces illustrated in FIG. 19. In this last case the captured images will be directly stored in electronic device's built-in memory 102, while in any other case they will be transferred to memory 102 at a later time.

Ordering Stage

Figure 3:
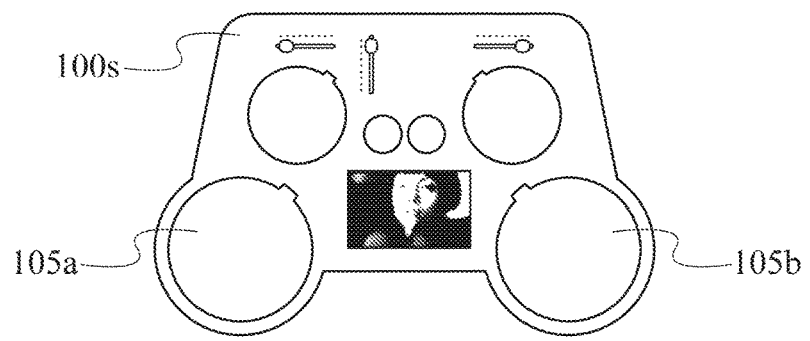
FIG. 3 illustrates a prototype of an advanced interface for the present invention, providing physical big-sized PREV and NEXT pads and two additional pads for instantly changing the step of the previous and next functions (e.g. selecting the next +2 frame or the previous −4 frame.

As illustrated in FIG. 3 and in FIG. 7, the software application, through said visual user interface 104, allow the user to select a subset or the totality of said number of digital images, 200, in order to achieve an ordered sequence of digital images 205. The images should preferably comply to the 16:9 aspect ratio, for ensuring optimal displaying on most recently produced visualization devices; if not, the software application of the present invention is able to performing automatic image crop to conform available images in to 16:9 aspect ratio.

Figure 4:
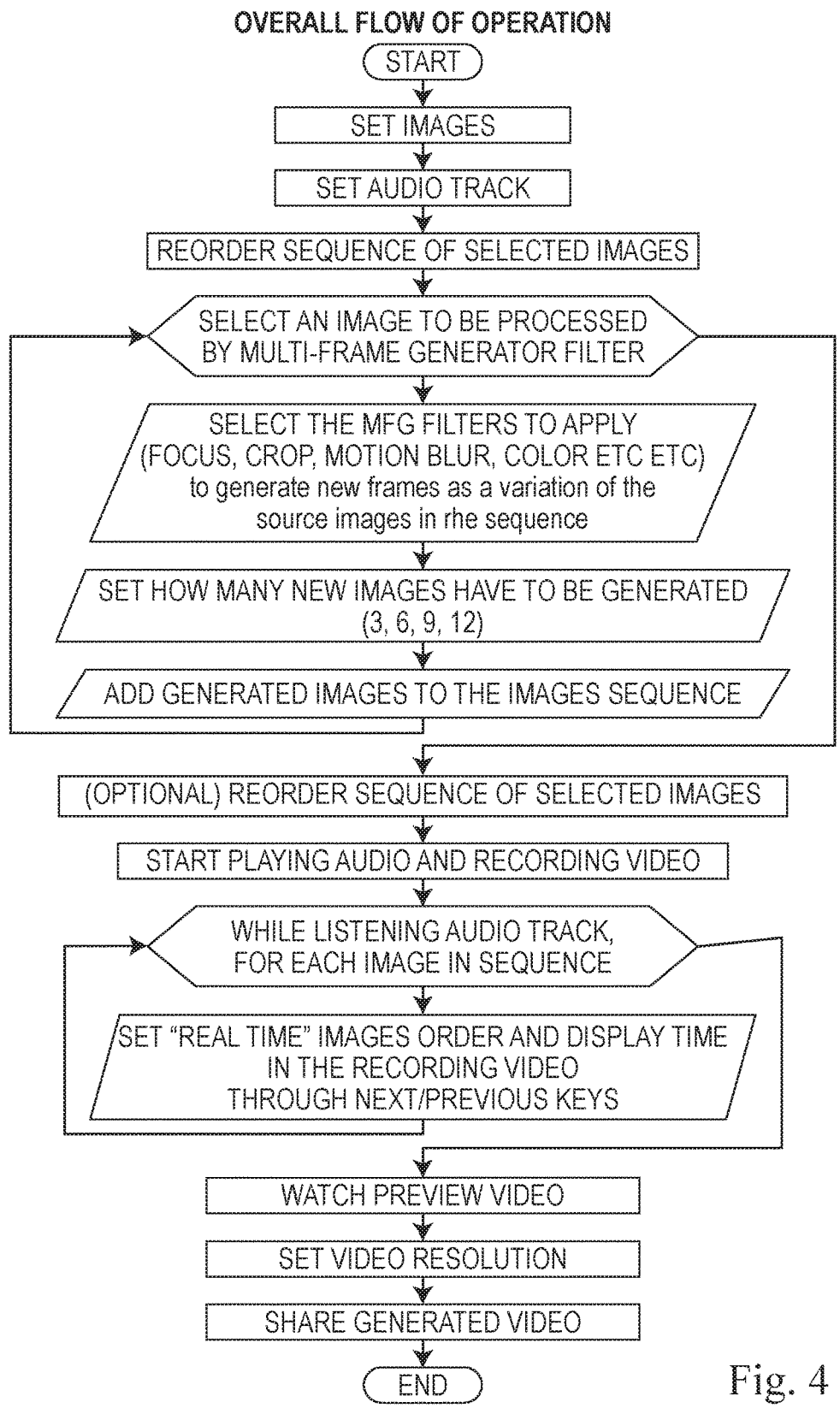
FIG. 4 explain the overall flow of operation.
Figure 5:
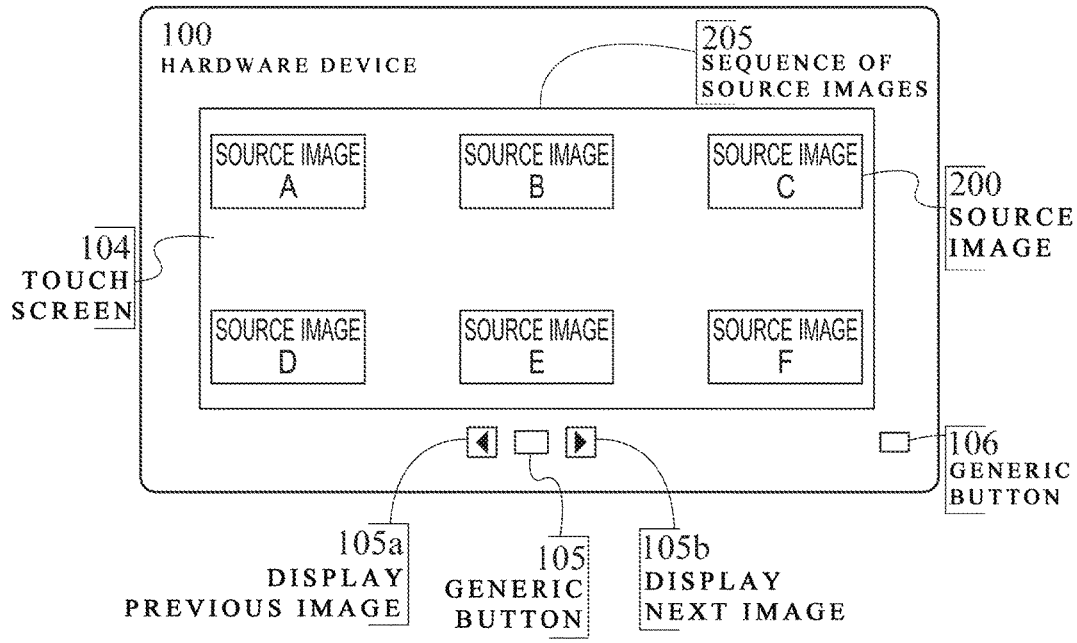
FIG. 5 depicts the user interface for controlling the electronic device enabling the execution of the software required for the preliminary visualization of selected gallery of images (Image Ordering Stage)
Figure 6:
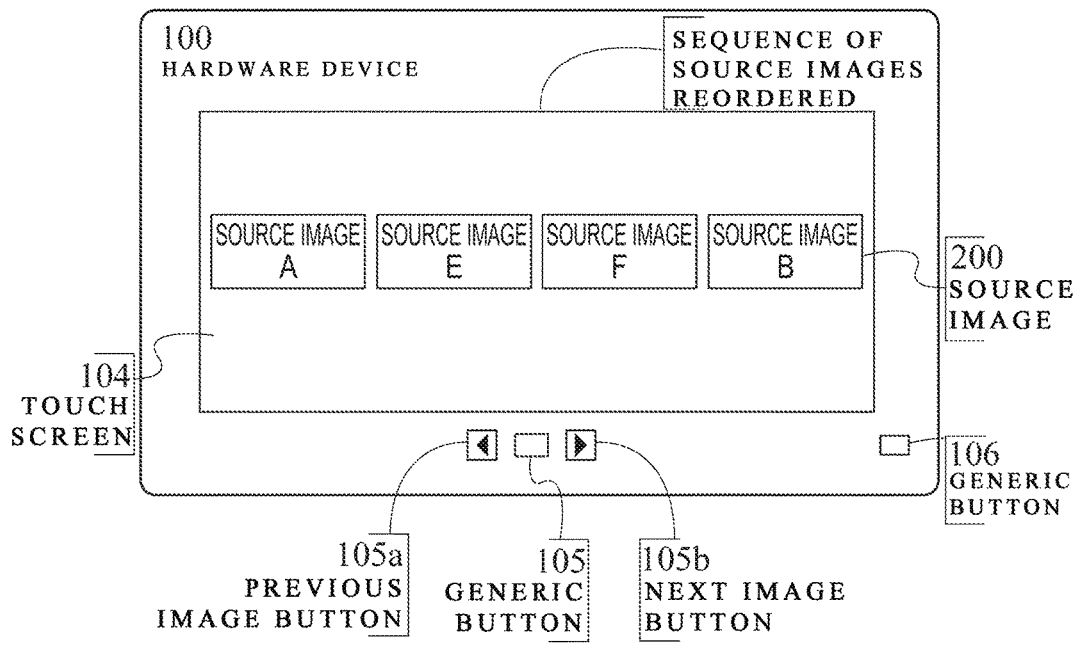
FIG. 6 depicts the user interface for controlling the electronic device enabling the execution of the software required for enabling the user to arbitrarily reordering the image sequence in the gallery (Ordering Stage)

More in detail, FIG. 5 and FIG. 6 schematically depict available digital images before and after re-ordering as indexed by letters A, B, C . . . consequently, in FIG. 4 the image in the middle of the sequence is changed compared to FIG. 3. The new resulting sequence of images is temporarily stored on memory 102 or alternatively on another local memory of said electronic device 100.

The selected image may optionally be enlarged as shown in FIG. 7, but such feature should not be considered as limiting since it represents only one of the available options provided by the software application. In any case, a preview window provided by the visual interface of the present invention enables instantaneous and intuitive navigation between available images. Additionally, as illustrated in FIG. 7, the software application provide manual functionalities for duplicating and zooming in the selected image or even for deleting the resulting image.

As soon as the image pre-ordering is complete the user can select the desired audio track (300) from a list of audio files available in memory device 102 by means of specific interface screen.

MFG Filters Application

Figure 9:
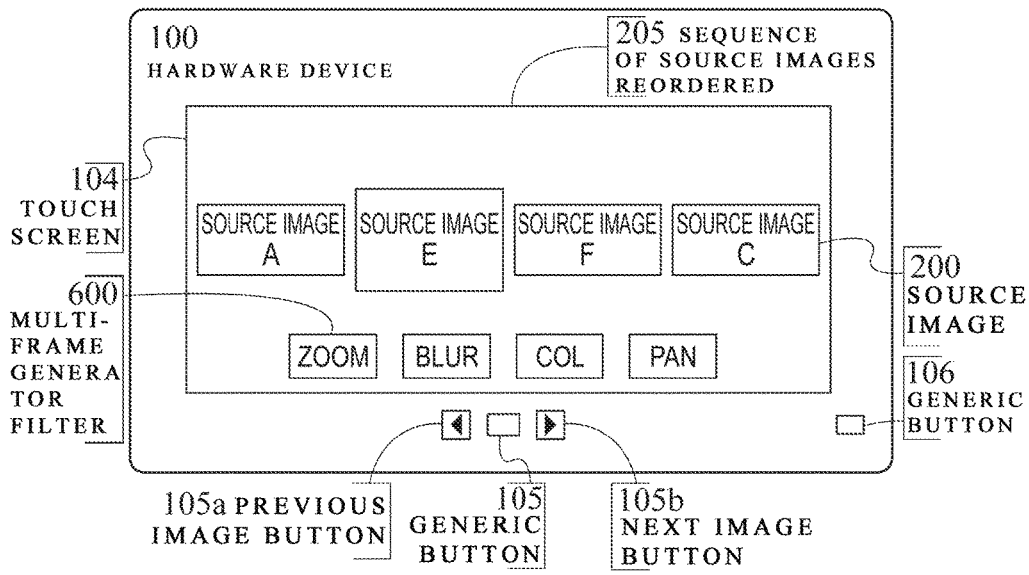
FIG. 9 illustrate the first steps of applying a Multi-Frame Generator Filter for creating multiple versions of a single (previously selected) source image.
Figure 10:
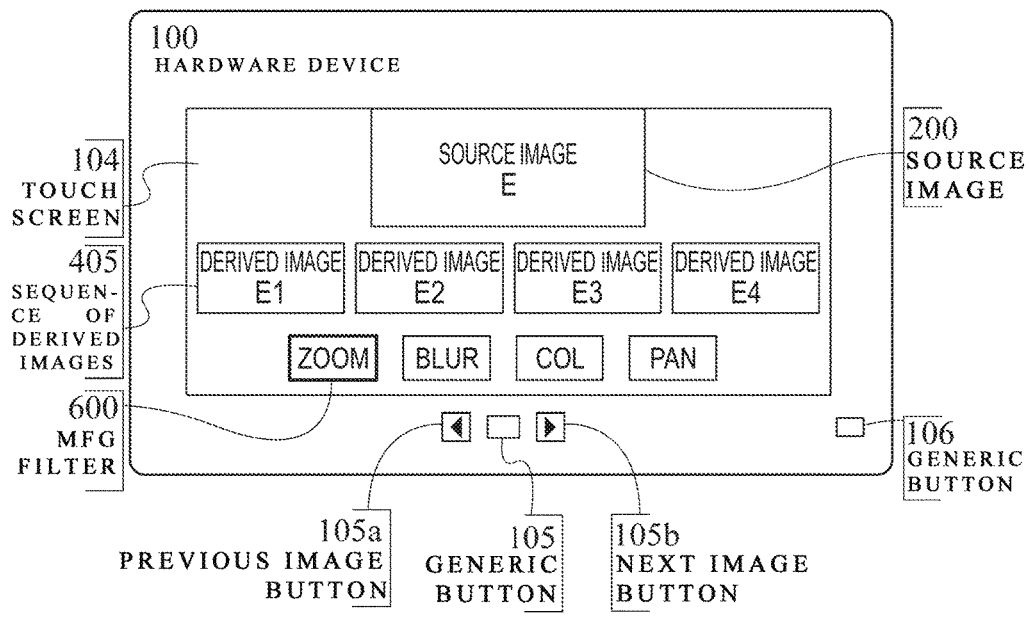
FIG. 10 illustrate the second steps of applying a Multi-Frame Generator Filter for creating multiple versions of a single (previously selected) source image.

As shown in FIG. 9, while pre-ordering the available images 205, the user may exploit specifically designed functions, referred as Multi-Frame-Generator-Filters, to procedurally increase the number of images which will be later used for creating the video.

More in detail the user selects one of the available images, applies a digital MFG filter to it and therefore, confirm the insertion of the processed image in the ordered sequence 205. As a result, the software application generates n copies of the selected image and each copy is processed according to the selected filter with a different level of effect's intensity, as illustrated in FIG. 11-12-13-14.

Figure 12:
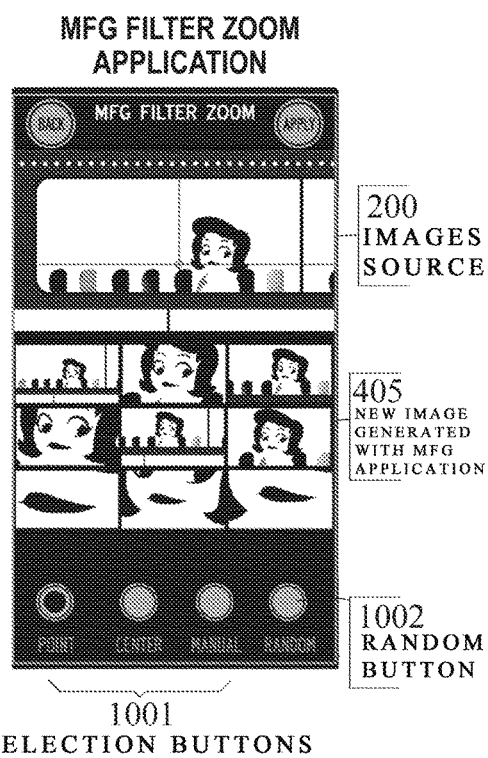
FIG. 12 shows a schematic view of a the MFGF interface step 2 for applying the desired filter/effect to the selected source image (displayed above) while previewing the resulting frames (displayed as thumbnails below the source image). In this particular case the filter applied perform an image crop/zoom and generate 9 new frames.
Figure 13:
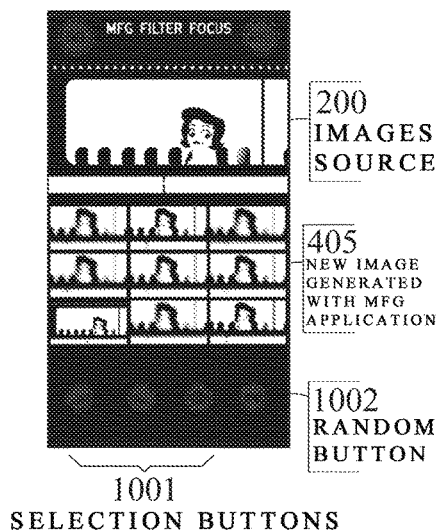
FIG. 13 shows a third screen of the Multi-Frame Generator Filters interface for applying the desired filter/effect to the selected source image (displayed above) while previewing the resulting frames (displayed as thumbnails below the source image). In this particular case the filter applied perform an image defocusing and generate 9 new frames.
Figure 14:
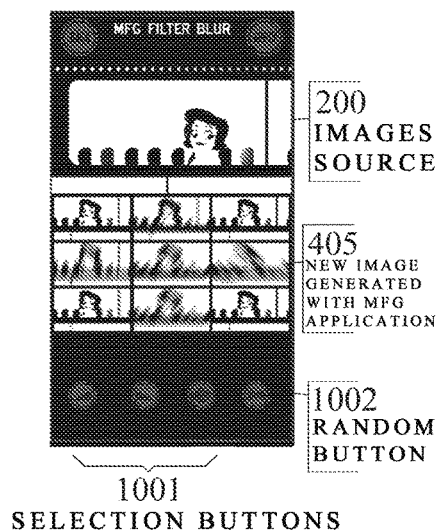
FIG. 14 shows a fourth screen of the Multi-Frame Generator Filters interface for applying the desired filter/effect to the selected source image (displayed above) while previewing the resulting frames (displayed as thumbnails below the source image). In this particular case the filter applied perform an image motion blur and generate 9 new frames.

Overall, the operating philosophy of MFGF is to providing the user with a suite of effects mimicking the classic film-based regulations achievable by means of actual (reflex or not) cameras. Whatever the effect chosen, the result is a sequence of n new images each featuring a smoothly increasing level of intensity in filter's effect. These "derived" images help in creating a better transition between images and it also enables a more effective audio-video synchronization compared to more conventional editing environment in which transition duration cannot be set in real-time. The filter suite is designed to allow even the inexperienced user to easily achieve a reasonably good result, while more sophisticated and complex filters might be available for a professional version of the present invention. As a first example, FIG. 12 shows the application of a "crop-and-zoom" filter by either specifying the crop region 1000 manually (manual crop selection key 1001) or selecting it automatically (automatic crop selection key 1002). Other examples are shown in FIG. 13, where a defocusing effect is applied to the selected image and in FIG. 14 where a motion-blur effect is applied.

Therefore in all the aforementioned examples, from a single image selected in the ordered sequence 205, new images are generated (405) to be inserted between the previous and the next images with reference to the original ordered sequence.

As illustrated in FIG. 9, new duplicates of selected image "E" are inserted between image "A" and image "F", each featuring a different (increasing) level of intensity in effects application. The filters provided by the software application include, but in any way are limited to, the following effects: color correction, desaturation, blurring/defocussing, crop-and-zoom, panning.

Figure 11:
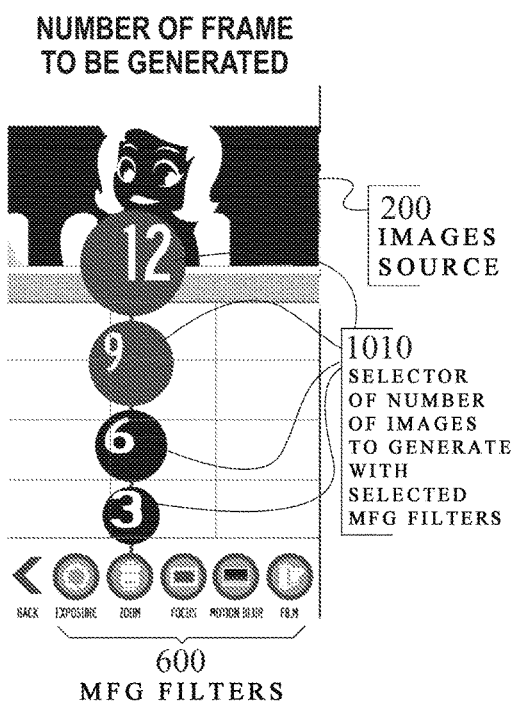
FIG. 11 shows a schematic view of a first screen of the MFGF (Multi-Frame Generator Filters) interface for selecting the desired number of frames to be generated from the selected source image.

As illustrated in FIG. 11, these filters are designed for easiness of operation even in case of inexperienced users and are accessible through a visual user interface 104 by means of icons which represent filter's available operating parameters.

All of each filter's available options and parameters can be saved and more filters' configurations can be saved as well for creating one or more desired image processing preset, specific for each user. Preset saving end loading is accessible through a specific interface screen.

Digital Camera Interface

Figure 19:
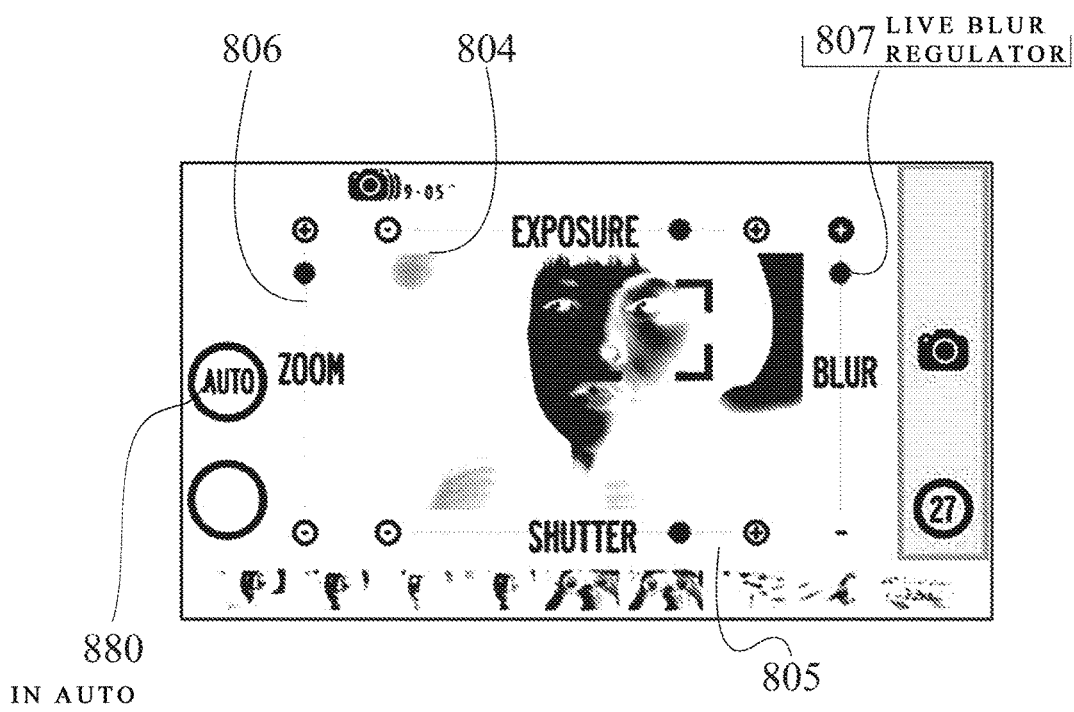
FIG. 19 shows an interface to operating the camera embedded with the device object of the present invention and to process the captured images through the related software.

As shown in FIG. 19, in case the electronic device 100 is used for shooting pictures, a specific screen of the visual interface will allow the user to take multiple shots each featuring a variation of focusing and/or zooming and/or shutter-timing parameters.

To this aim, keys 804-807 which control exposition, shutter, zoom and blur are located along the four sides of the interface (top, left, bottom and right) around the image viewing area that is roughly central with respect to the whole interface.

This interface layout is meant to provide a more immediate level of control of image parameters. Preferably, the aforementioned controls are graphically rendered as sliders which regulate the related effect between a minimum and a maximum level of intensity. However, the software application is also able to automatically setting the variations of each parameter for each new shot, optimizing the result to harmoniously inserting the new shot(s) within the existing sequence of image to be used in the video recording step. In case the electronic device 100 is equipped with a digital camera, the exposition and zoom controls will directly control the camera hardware, while shutter timing and blur controls will operate at a software level (by processing the incoming images in real-time) because typically built-in cameras for electronic devices 100 (i.e. smartphones, tablets, etc.) do not provide manual shutter control. Possibly, the built-in camera of electronic device 100 could be able to take pictures at resolution greater than the Full HD standard (1920×1080 pixels).

Today indeed, many smartphones and tablets are capable to taking pictures at higher resolutions. Consequently, the method and system subject of present invention is capable of producing video at a resolution matching the single-shot resolution capabilities of the capture device thus exceeding the typical video-capture resolution provided by most consumer devices or achieved by using commercially available screen-capture software applications.

In case the software application in electronic device 100 has been set to operating in automatic mode by pressing the "AUTO" key 880, the camera interface 104 will not show the aforementioned controls and image capture parameters will be automatically regulated to optimizing the result for the subsequent video recording process. This optimization, indeed, is inherently different from typical automatic exposure regulation provided by most cameras, as the latter is designed for static images, while the proprietary optimized automatic capturing feature in electronic device 100 is specifically aimed to regulating image parameters in a way functional to the visually harmonic insertion of the resulting pictures between two properly exposed images, that is the fundamental premise for obtaining a pleasant video. Every n-th images, the automatic image capture function returns to the standard parameters regulation (e.g. every six shots all the involved parameters return to their default values) and then the cycle start again.

Recording Stage

Figure 16:
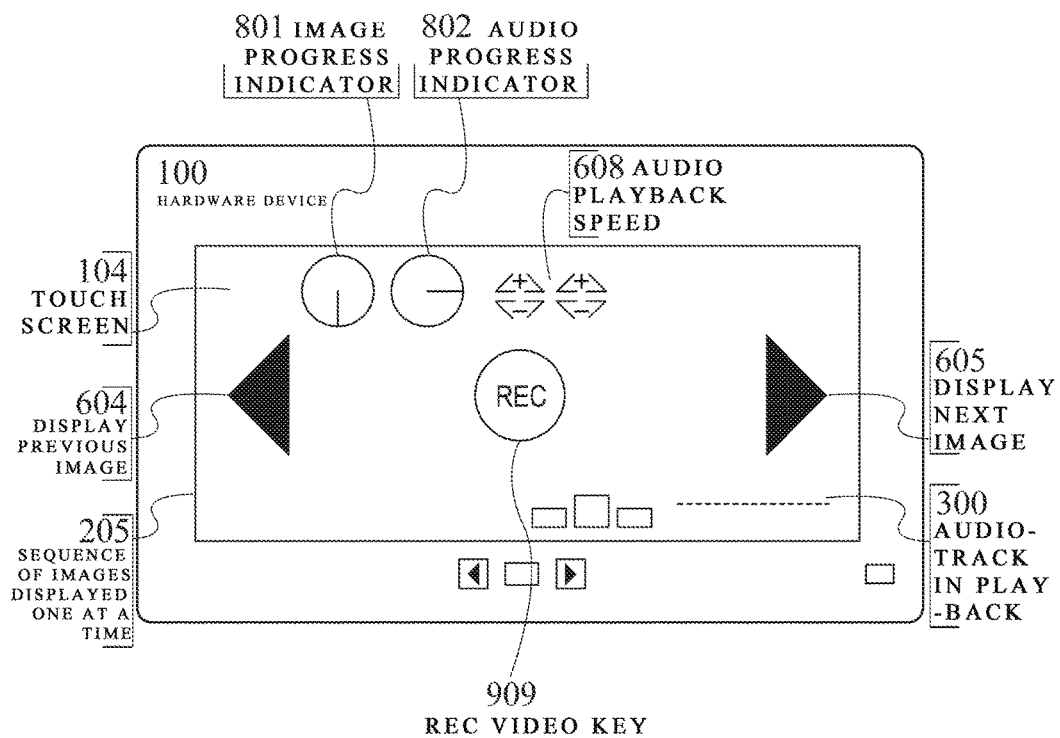
FIG. 16 shows a schematic view of the main software related to the present invention during the stage of instant video recording while simultaneously listening a digital audio track (Recording Stage)
Figure 17:
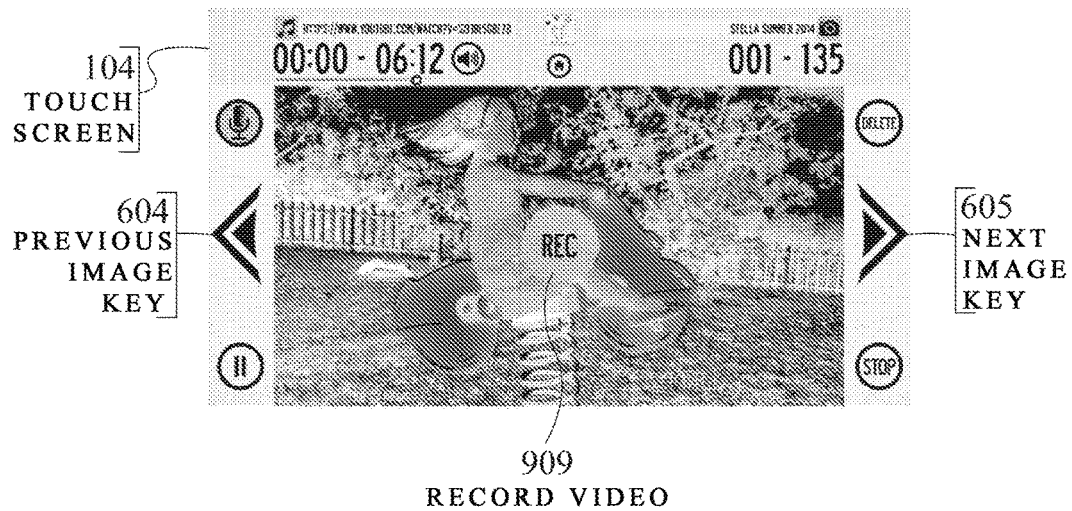
FIG. 17 depicts a first screen of the video recording interface showing the rec key (909) enabling the playback of the audio track and the simultaneous recording of the audio-video sequence.
Figure 18:
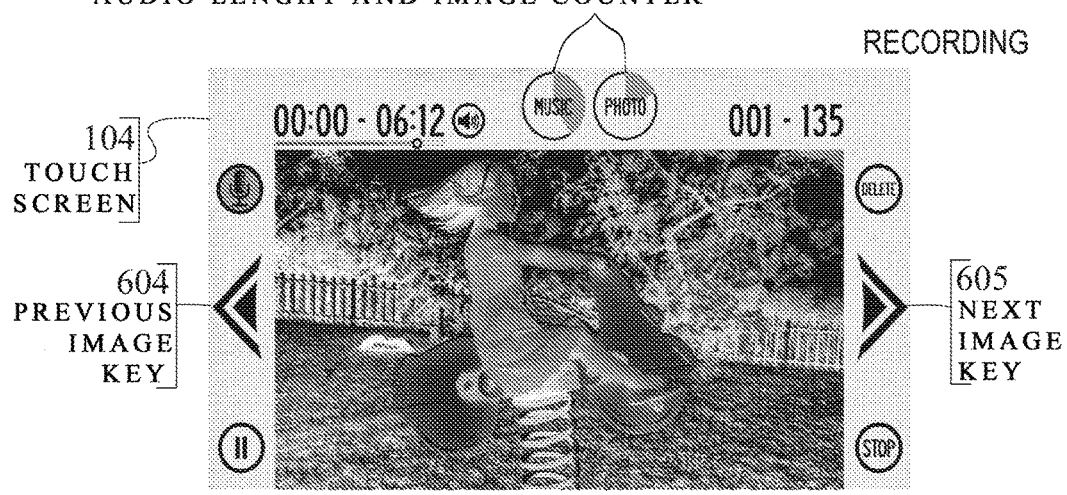
FIG. 18 depicts a second screen of the video recording interface showing the rec key pressed and both the playback of the audio track and the selection of the current image in the pre-ordered gallery by pressing the previous and next keys resulting in the simultaneous recording of the audio-video sequence. It also shows two progress indicators (801-802) positioned in the top side of the interface and monitoring residual audio duration and residual number of unused frames.

As shown in FIGS. 16, 17 and 18, during the Recording stage of the video creation process, a specific interface screen provides controls for starting the reproduction of selected audio track 300 and for changing the currently displayed image with the next one or the previous one in the ordered images sequence 205 by simply pressing the key 604 (or 105*a*) or the key 605 (or 105*b*) that in the above mentioned figures are implemented by means of a visual touch-based interface 104. More precisely, the recording process is triggered by pressing a specific "REC" key (909) that, depending on system configuration, causes audio reproduction and image-audio recording to start instantaneously, or, optionally, starts a countdown allowing the user to get ready for the recording start.

Additionally, the user could start a live-audio recording during the Recording step by simply pressing a specific "TALKOVER" key 888.

Figure 15:
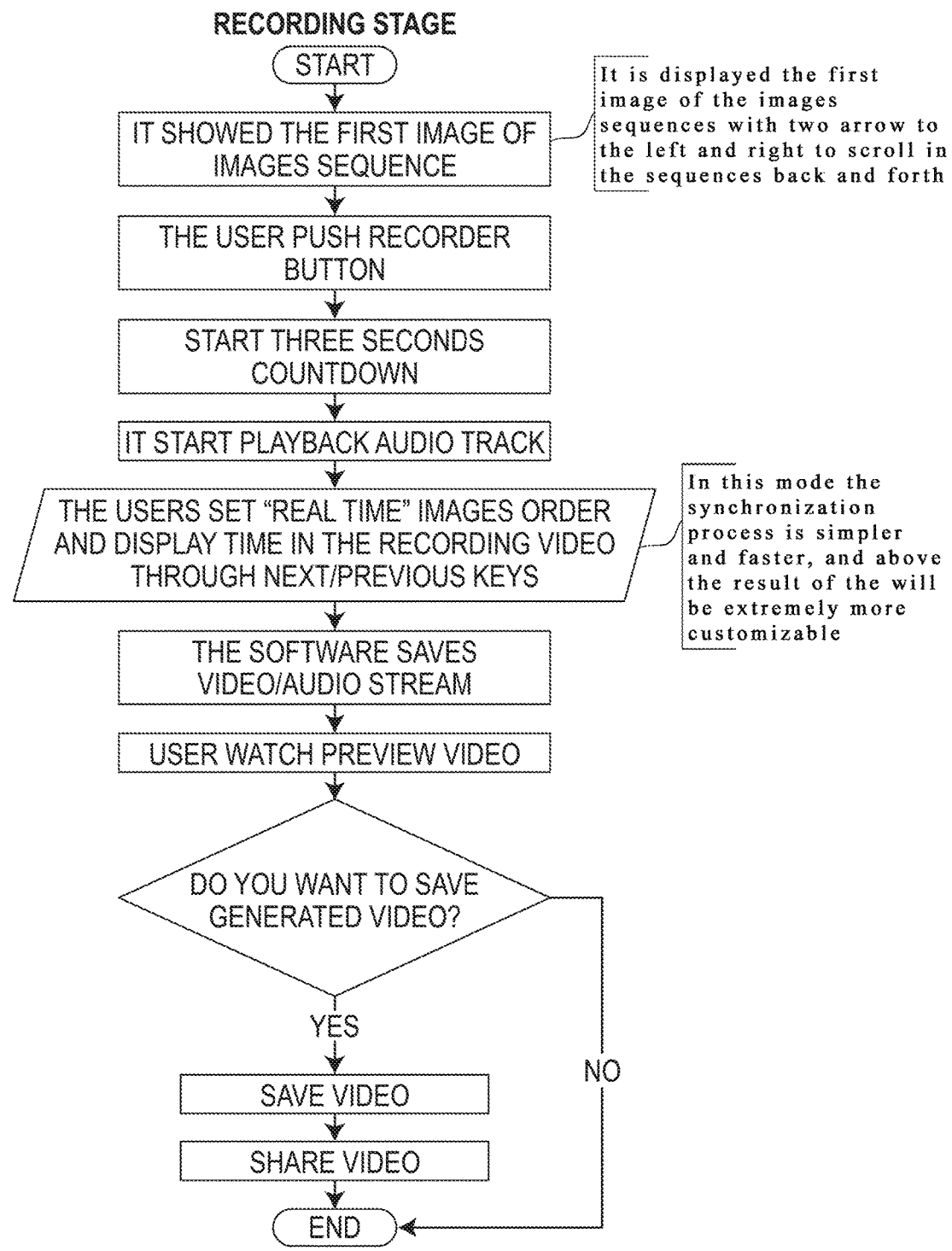
FIG. 15 Describe the Recording Stage flow chart.

FIG. 15 describes the Flow-chart of the Recording Stage.

At first, the first image of the images sequence is shown.

By pressing Rec Video Key (909) the audio reproduction starts and the users is able to change the currently displayed image with previous or next one in the sequence of the images by means 604-605 keys (or 105a-105b). The system will record a Video in which any still image will be edited for the duration and in the order stabilized from the user "REAL TIME" listening the music during this recording stage.

Once the procedure is ended, the audio/video stream is saved temporarily for letting the user preview the video. Then, the user has the choice to save the generated video.

If the video is saved, it can be shared.

To the aim of providing visual means for controlling the residual amount of available images and the residual duration of audio track during the recording stage, the visual interface 104 includes (FIG. 18) two iconic indicators 801 and 802. The first indicator 801 intuitively visualizes the position of currently displayed image within the sequence of available images 205 by means of a circular clock-shaped icon, whose moving hand indicates the current image and divides the circle area in two portions: the portion before the hand (clockwise) indicates the images already displayed, while the portion after the hand indicates the remaining images to be possibly visualized.

Similarly, the second indicator 802 intuitively visualizes the position currently played in the audio-track by means of the same visual metaphor, the portion before the hand (clockwise) indicates the audio already listened, while the portion after the hand indicates the remaining audio 300. The approach to the visual designing of these indicators is meant to facilitating instant and intuitive comprehension of the residual image/audio duration, enabling the user to deciding on-the-fly whether speeding up or slowing down the image switching considering the remaining duration of audio track. The circular shape of the icons 801 and 802 has to be considered only a preferred appearance of the related indicators and by no way it should be meant as limiting their possible appearance that, for instance, could well be in form of a progress bar. Additionally, numeric info could be associated to the graphic indicators, regardless of their aspect, to informing the user about the exact residual number of images and remaining audio duration.

Live Performance Mode

With a particular embodiments of the electronic device it's possible to realize "Live performance", providing an enhanced recording modality that allow the user to change the current image 200 not just with the next/previous one (as described in the Recording step section) but with the next/previous Nth image in the sequence 205 instead. This advanced functionality is controlled by means of a set of specific keys 1004. The software application also enables to simultaneously controlling multiple video sequences 1009, thus providing sophisticated video creation capabilities, suited even for professional use.

Console

A particular embodiment of electronic device 100 is represented in FIG. 3, in which a console-based version of present invention is shown. In this embodiment the main operating controls and keys are implemented as physical dials and buttons, providing a more responsive feedback and a greater precision in their usage compared to a touch based visual interface.

The Advantages of Present Invention

The advantages of present invention emerge from its description provided above. More explicitly, the present invention provides a novel, intuitive and simple way for creating video from a sequence of still images, enabling a music-inspired emotion-driven approach to real-time image sequence assembling without requiring any complex calculation based on the soundtrack's length. In other words, the user not only does not need to have editing skills and knowledge, but can exploit his/her sense of rhythm or the flow of emotions inspired by listening to the desired soundtrack to achieving a personal and interesting video, without requiring any post-processing steps. Each image's display duration as well as when it has to be changed with the previous or next image in the sequence is instantly decided by the user in real-time. Moreover, the nature of this video recording process, based on simultaneous music listening, inherently avoids any out-of-sync between images and audio. The whole video generation process can therefore become more a "gaming" experience in terms of instinctive reaction to the audio stimuli.

The system and method subject of present patent request enable the user to generating a number of "derived" images from each available source image (FIG. 8b-FIG. 9-10). These "derived" (405) images are produced by means of image processing techniques (600 Multi-Frame Generator Filters) applied to the source image and are meant to smoothing the transition between any two source images, thus resulting in a better chance of synchronization between images and audio. As said before these "derived" images (405) help in creating a better transition between images and it also enables a more effective audio-video synchronization compared to more conventional editing environment in which transition duration cannot be set in real-time.

The original approach to the camera interface (FIG. 19) featured by the present invention, is directly originating by the idea of assembling video by means of real-time effective transitions between available images. The interface layout and the choice of available controls while capturing an image, are closely related to the subsequent stage of real-time recording, greatly increasing the suitability of the captured pictures to the creative process. Moreover, captured images may feature the maximum resolution of the capturing device, that is plausibly much greater than the video capturing resolution of most commercially available imaging devices, thus enabling the user to produce video of very high quality (image wise).

For resuming, dealing with FIG. 4. FIG. 8b, and FIG. 15, the present invention allows for:
  setting a plurality of images and set an audiotrack;
  reordering the sequence of selected images;
  selecting an image to be processed by MULTI-FRAME GENERATOR FILTERS, to generate new frames as a variation of the source images;
  adding the generated images to the image sequence;
  and then optionally reordering the sequence of selected images;

then the user realize a video listening audio tracks, and for each image of the still image sequence set REAL TIME images order and display time through next/previous keys (604-605- and/or 105*a*-105*b*);

then watching the video preview;

set the video resolution before sharing the so created video.

The invention claimed is:

1. An audio/video editing electronic device, said device comprising:
at least visual and manual user interface means configured for allowing the interaction with said user;
a data processing unit, configured for executing a computer program aimed to the creation of video contents by combining a gallery of still digital images and a digital audio track through "on-the-fly" synchronization inspired by music listening;
means of access to a plurality of digital images;
means of access to at least one digital audio track;
said electronic device is configured for presenting on said visual interface means at least part of said plurality of digital images in a predetermined images appearance sequence from said user through said manual interface means (Previous/Next keys);
and for recording a video creation by simultaneously playing the digital audio track and displaying each of the digital images according to the desired duration and order by simply pressing the Previous/Next keys; the pressure of any of the Previous/Next keys triggers the changing of the currently displayed digital image and the recording of the previously displayed frame, for a duration corresponding to the time elapsed since it was shown; said user is able to browse "on-the-fly" the images appearance sequence while simultaneously listening to the selected digital audio track and transparently recording the audio-video association;
said electronic device comprising means for increasing the number of available digital images by means of Multi-frame Generator Filters which, applied to a selected image or even to a set of images, deliver multiple variations of each image by generating n copies of the selected image and each copy is processed according to the selected filter with a different level of effect's intensity; any of the Multi-frame Generator Filters is able to create a set of variations of the selected image by applying an image-processing algorithm according to a set of specific parameters assigned either in "Manual" and "Automatic" modality; the "Automatic" modality first selects on which images to apply the filters to generate the new images, and then generates a number n of new derived images according to the number of images inserted into the images appearance sequence and according to the length of the selected digital audio track.

2. The device according to claim 1, wherein said manual user interface means comprise at least a forwarding command of images and a rewinding command of images with respect to said predetermined images appearance sequence respectively acting for causing a presentation on said visual user interface means of a following and previous image with respect to the image currently shown.

3. The device according to claim 2, wherein said commands cause the setting and the recording of the order and the time of transition for each image in the recording video.

4. The device according to claim 2, wherein said commands further comprise a command for live audio recording during the recording step by simply pressing a specific "talkover" key.

5. The device according to claim 1, wherein said visual user interface means are designed for providing an integrated graphic representation of the position of the currently displayed image in the ordered image sequence, and the indication of the reproduction point of said audio track with the respect to the beginning and/or the end of said audio track; the two pie-shaped indicators are integrated in the interface, displaying respectively the remaining duration of the audio track and the remaining number of unused images as an unfilled fraction of a circular area, whereas the filled fraction represents respectively the elapsed audio timing and the number of frames already displayed.

6. The device according to claim 2, comprising a first and a second body; said device being characterized in that said first body comprises at least said visual interface means and wherein said second body comprises at least said forwarding commands and rewinding commands of images on said predetermined images appearance sequence, said first and second body being alternatively electrically connected by a cabled data transceiving means or a wireless data transceiving means.

7. The device according to claim 1, wherein said derived images are generated from the images available in the ordered image sequence wherein the generated images are characterized by an increasing or decreasing level of application of photo-filter's effect selected by the user.

8. The device according to claim 1, wherein said Multi-frame Generator Filters (600) are applied alternatively with a selection of an application area and/or point of center of application manually performed by the user or with a procedure of preferential selection point automatically managed by said device.

9. The device according to claim 1, comprising means adapted to select instantly for each image the order and the temporal interval of visualization in the recording video browsing back and forth in the sequence previously ordered with key.

10. A method of creation of video contents by combining a gallery of still digital images and a digital audio track through "on-the-fly" synchronization inspired by music listening, said method comprising:
a preliminary step of definition of an ordered sequence of digital images obtained from a plurality of digital images stored on a memory support,
and a subsequent step of selection of at least one audio track,
and a subsequent step of reproduction of said audio track on an electronic device,
and a step of Recording of a video creation by simultaneously playing the digital audio track and displaying each of the digital images according to the desired duration and order by simply pressing the Previous/Next keys; the pressure of any of the Previous/Next keys triggers the changing of the currently displayed digital image and the recording of the previously displayed frame, for a duration corresponding to the time elapsed since it was shown; said user is able to browse "on-the-fly" the images appearance sequence while simultaneously listening to the selected digital audio track and transparently recording the audio-video association;
said method further comprising a step of increasing the number of available digital images by means of Multi-frame Generator Filters which, applied to a selected image or even to a set of images, deliver multiple variations of each image by generating n copies of the selected image and each copy is processed according to the selected filter with a different level of effect's intensity; any of the Multi-frame Generator Filters is able to create a set of variations of the selected image by applying an image-processing algorithm according to a set of specific parameters assigned either in "Manual" and "Automatic" modality; the "Automatic" modality first selects on which images to apply the filters to generate the new images, and then generates a number n of new derived images according to the number of images inserted into the images appearance sequence and according to the length of the selected digital audio track.

11. The method according to claim 10 comprising a step of at least temporary downloading on a local memory support of said audio track, when it is stored on a memory support remotely positioned with respect to an electronic device onto which said user acts.

12. The method according to claim 10, wherein said Real Time selection of the order and the time duration of each still image to be insert in the video by means of repeated use of said "step forth" and "step back" commands is performed through the action on visual user interface means and touch sensitive means of the electronic device onto which said user acts.

13. The method according to claim 10, comprising a step of storing the resulting video, mixed audio/video stream, either on a memory of said electronic device or on a memory remotely positioned with respect to said electronic device.

14. The method according to claim 10, comprising a command for live audio recording during the recording step by simply pressing a specific "talkover" key.

15. The method according to claim 10, comprising a graphic representation of the position of the currently displayed image with respect to the first and the last frame in the ordered sequence of digital images, and a graphic diagram of a current reproduction point of said audio track with respect to a beginning and/or an end of said audio track; said graphic diagrams of the position of the now shown image and said graphic diagram of said reproduction point of said audio track are provided for helping the user during said video recording step by evaluating residual duration of available visual and audio content; the two pie-shaped indicators are integrated in the interface, displaying respectively the remaining duration of the audio track and the remaining number of unused images as an unfilled fraction of a circular area, whereas the filled fraction represents respectively the elapsed audio timing and the number of frames already displayed.

16. The method according to claim 10, comprising a step of multiple frame generation, applying the Multi-frame Generator Filters from at least one digital image resulting in a plurality of "derived" digital images to be inserted into said intermediate sequence of digital images, said derived images being characterized by the gradual application of a photo-filter's effect; said step of multiple frame generation being either performed Manually by said user or performed automatically by said electronic device by calculating the amount of new digital images to be introduced into said ordered images sequence starting from the number of images already available in said ordered image sequence and according to the length of said audio track.

17. The method according to claim 10, comprising a step of management of a digital image-capturing device included in said electronic device of digital images capturing in accordance with a detailed description of the invention; said step of management comprising a manual or automatic configuration of a plurality of parameters; in case the software application in electronic device has been set to operating in automatic mode by pressing the "AUTO" key, the camera interface will capture pictures with photographic parameters automatically regulated to optimizing the result for the subsequent video recording process.

18. The method according to claim 10, comprising a step of recording live audio by a microphone simultaneously to the recording the video from still image insert in the ordered sequence of digital images; said step of recording performed through the action of the user on a command shown on visual user interface means of said electronic device.

19. The method according to claim 10, comprising a step of presentation of a real-time management interface for recording of said video, wherein the transition from an images in said ordered sequence of digital images to another image is performed by means of manual controls on said forwarding and/or rewinding commands of digital images.

20. A computer program of simplified video creation comprising at least a sequence of digital images starting from an audio track, said computer program being stored on a non-transitory memory support and configured to be loaded on at least a data processing unit of electronic device; said computer program performing the execution of the various steps of the method according to claim 10.

* * * * *